FIG. 1

INVENTOR.
CHARLES WASSERMAN
BY
ATTYS.

United States Patent Office 3,002,147
Patented Sept. 26, 1961

3,002,147
REMOTE CAPACITOR SWITCHING APPARATUS
FOR POWER DISTRIBUTION SYSTEM
Charles Wasserman, 3615 Clarinth Road,
Baltimore 15, Md.
Filed June 9, 1958, Ser. No. 740,799
18 Claims. (Cl. 323—105)

This invention relates generally to the control of power distribution systems, and more particularly to automatic remote control apparatus for switching transmission line capacitors to provide power factor correction for a power distribution system.

In recent years, new loads on power transmission and distribution systems have become increasingly reactive. The problems of providing new generation facilities to supply the new loads have been amplified by the decreasing power factor of the loads. Capacitors have been installed on various substation busses and distribution feeders throughout the systems to supplement new generator reactive capabilities in an effort to obtain maximum system economy. While it is almost universally recognized that capacitors are most effective near the customer load, the general application of capacitors in large quantities on distribution feeders has been retarded due to the lack of a satisfactory switching control system. Various local control methods have been tried including time, voltage, current, temperature and combinations thereof, but these have been found to have many drawbacks.

Properly located line capacitors switched by an adequate control system may provide several benefits. For instance, thermal relief of feeders, substations and transmission lines is possible. This may increase the capabilities of existing equipment considerably thus deferring expensive system additions. Voltage control can be provided which permits the omission of costly tap-changing-under-load equipment on many new transformers. Also, the frequency of operation of existing regulators and tap-changers is reduced, and this reduces maintenance costs and in some cases permits removal of existing equipment. System losses occurring primarily at peak load conditions can be reduced resulting in savings in fuel and capital investment.

Accordingly, it is an object of this invention to provide a new and improved automatic control system for switching power distribution line capacitors.

Another object of the invention is to provide a reliable automatic capacitor switching system controlled remotely from a central station through information available at power distribution substations.

Another object of the invention is to provide an efficient and economical automatic remote capacitor switching system which requires minimum supervision and maintenance, which is readily installed at low cost, and which makes maximum utilization of existing regulating equipment and is in part interchangeable therewith.

A feature of the invention is the provision of a remote control system for switching capacitors by transmission of a carrier signal from a central station over feeder lines, with the carrier being modulated sequentially by different tones whose frequencies are controlled by a plurality of resonant-reed circuits. A control unit is provided on the feeder lines to switch each capacitor bank selectively in response to "off" and "on" tones.

A further feature of the invention is the provision of a control system as described in the preceding paragraph including sequenching and timing apparatus for selecting between "on" and "off" tones according to a need for switching capacitors on or off the line, for applying the selected tones in a desired sequence until the load is corrected, and for completing the sequence with the other type of tones after the load has been corrected.

Another feature of the invention is the provision of an automatic capacitor switching system having a recorder which displays the condition of the load, and manual initiating and selecting controls which permit observation and testing of the operation of the system as a whole from a central station.

A further feature of the invention is the provision of a remote control system for switching a large number of capacitors distributed throughout a feeder system, including a control unit coupled to the feeder line by a loopstick antenna, and having a transistorized carrier signal receiver with resonant-reed relays tuned to provide selective response to particular "off" and "on" control signals. The control unit is small and compact and may be packaged in a plug-in meter case to afford easy installation and interchangeability with existing time control equipment. The temperature within the meter case may be controlled by a thermostatic heater and a thermal shield which prevent excessively high or low interior temperatures.

Still another feature of the invention is the provision of a switching control unit including a carrier receiver having frequency selective relays connected to the output whose response is delayed to avoid spurious operation due to noise, and having a lockout arrangement for these relays to prevent undesired switching upon reception of a tone which corresponds to the present condition of the capacitor.

The invention is illustrated in the accompanying drawings in which.

The remote capacitor switching control system of the invention provides automatic switching control from a central station for a large number of capacitor banks located on the feeder lines of a power distribution system. Switching is accomplished by supplying carrier current over the feeder lines to a plurality of switching stations each including a control unit which may be mounted on a poletop along with the capacitor bank and switch apparatus. At the central station there is provided a transmitter, a coder, and a sensing device for automatic operation, and a recorder and various switches to permit manual operation for testing purposes. The carrier provided by the transmitter is frequency modulated by tones whose frequency is controlled by a plurality of resonant-reeds. The frequency band of the tones may be divided into as many channels as required to provide different "on" and "off" tones for each switching station. The sensing device determines what type of tones are needed and initiates operation of a control circuit which applies the tones to the transmitter in the desired sequence. The control unit for the switching stations is packaged in a standard meter case, and is plugged into a socket device which is connected in the system. Signals are picked up from the feeder line by a ferrite loopstick antenna inductively coupled to the line and connected to the socket device. The plug-in mounting of the control unit permits convenient installation and removal, thus eliminating poletop maintenance and reducing maintenance and installation costs. The control unit contains a transistorized carrier receiver and two audio frequency resonant-read relays, one for "on" switching and another for "off" switching. These relays are connected in parallel to a direct current switching control circuit. Only one of the resonant-reed relays is conditioned for operation at a given time depending on the position of the capacitor switch, so that if the capacitor switch is closed by one tone, subsequent tones of the same frequency will not cause further switching. The switching control circuit also includes integrating components to provide continuous energizing current and a time delay is provided to protect against spurious operation. A thermostatically controlled heater supplies heat inside the meter case to permit operation at low temperatures, and the outside of the meter case is coated with a heat reflective paint to avoid excessively high interior temperatures.

Figure 1:
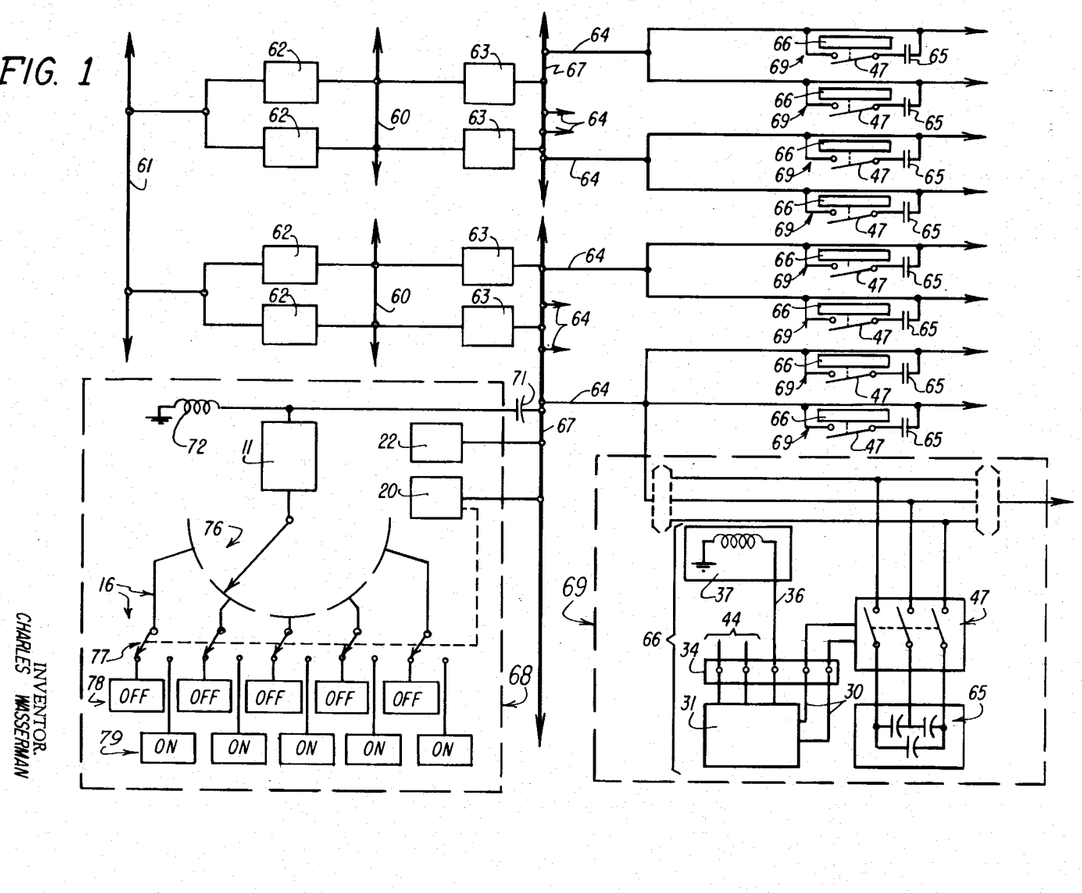
FIG. 1 is a schematic diagram showing a power distribution system provided with an automatic remote switching control system in accordance with the invention.

The operation of the system as a whole can be understood generally from a consideration of FIG. 1. The transmission and distribution system shown here is a typical master-substation type of present day design and illustrates the application of switched distribution capacitors for both thermal and voltage correction. Power is supplied from a 110 kilovolt bus 61 through four master stations 62 which step down to 33 kilovolts or 13 kilovolts as required to supply both industrial consumers and distribution substations. Four distribution substations 63 step down from 13 kilovolts at busses 60 to 4 kilovolts at busses 67. A central control station 68 may be provided at one or more of the distribution substations 63 in order to provide automatic control for different sections of the 4 kilovolt busses 67. A group of 4 kilovolt feeders 64 each having capacitor banks 65 located thereon distribute power to general consumers. The switching stations 69 each include apparatus 66 for operating the switches 47 which connect or disconnect the associated capacitor banks 65 in response to carrier signals modulated by "on" and "off" tones in a sequence determined by the load characteristics.

The central control station 68 includes power line carrier transmitting apparatus 11 which is coupled to the 4 kilovolt bus 67 by a standard power factor correcting capacitor 71. A drain coil 72 is provided to ground the capacitor 71 for 60 cycle current and to present a high impedance to current at the selected carrier frequencies. A carrier frequency of, for example, 60, 100 or 140 kilocycles may be used, and different sections of the distribution system may use different ones of these frequencies. The transmitter 11 sends out the carrier signal continuously, and it radiates through the entire feeder system supplied by the associated substation. A sensing device 20 detects any need to have more or less capacitors connected into the system and causes the coder apparatus 16 to select the tones which will switch on or off the required number of capacitors. When sufficient tones of one type have been sent out to correct the load characteristics, the sensing device returns to its normal condition. The coder 16 then continues to send out tones of the opposite type until the sequence is completed. Thus, all of the switching control units 66 supplied by the central station 68 receive a tone of one type or the other each time the sensing device operates, and this helps to insure reliability of operation.

The sequence in which the coder 16 applies the tones is controlled by scanning apparatus designated generally as 76. A sequence which provides "last-on first-off" capacitor switching has been found to be desirable. The contacts of the scanning apparatus are connected through selecting apparatus indicated generally as 77 to "off" tone generators 78 or to "on" tone generators 79. The sensing device 20 controls the initial selection made by the apparatus 77, so that if "on" tones are needed, apparatus 77 switches in tone generators 79. As the scanner 76 steps through the sequence, "on" tones are sent out until one or more capacitor banks are switched on in addition to those already on the line. When sufficient capacitor banks are connected, the switching apparatus 77 automatically connects tone generators 78 into the circuit to send out "off" tones for the rest of the scanning sequence.

The scanning apparatus may be timed to operate periodically so that the full sequence of tones is repeated even if no changes are required, and this provides compliance with the desired switching sequence. For instance, if the sensing device has called for more capacitors, and if one of the "on" tones in the middle of the sequence should fail to switch on a capacitor, an extra "on" tone would be added before the "off" tones begin, thus destroying the desired sequence. However, repeated operation of the scanning apparatus 76 tends to correct this by switching on the omitted capacitor and switching off the extra capacitor which was added at the end of the "on" portion of the previous sequence.

The sensing device 20 may be made responsive to any one of several load characteristics. For instance, a sensing device may be provided which responds to increasing or decreasing kilowatt loads to cause the control system to connect or disconnect capacitors progressively until the load is corrected. Voltage bias may be used with such a sensing device to increase or retard the rate of closing or opening. A sensing device which provides a voltage dead-band may be used so that a preselected bus voltage may be maintained. The voltage dead-band may be shifted by bus loading as required. Similarly, a device may be used which provides a reactive dead-band whereby any preselected reactive load can be maintained within the capability of the capacitors. A meter or recorder 22 provides a visual indication of the reactive load characteristic. Since operation of any one capacitor bank may change the station reactive load considerably, operation of a single bank is clearly visible on the recorder.

Figure 2:
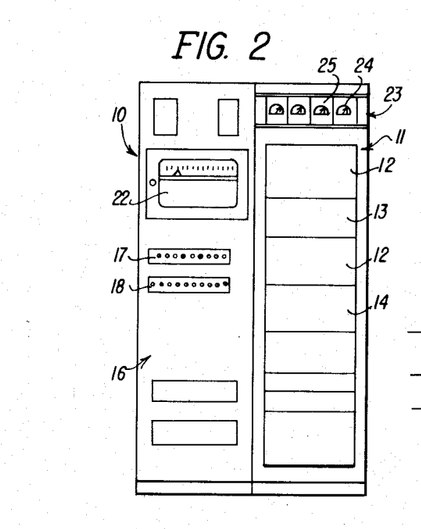
FIG. 2 is a view of the coding, transmitting, and indicating equipment for the control system of the invention.

The equipment 10 provided at the central control station 68 is shown in FIG. 2. The equipment 10 includes the carrier transmitting assembly 11 in which there may be two frequency modulation transmitter units 12, one for main operation and one for standby operation. The transmitting assembly 11 also includes a switchover unit 13 for switching the main and standby transmitters. A meter panel 23 is provided with a direct current meter 24 for transmitter alignment and a radio frequency ammeter 25 for adjusting the output of a tuning unit 14 which tunes out any inductive effect the coupling capacitor 71 may have at the carrier frequency so that the carrier power is effectively coupled to the line.

The equipment 10 also includes the coder 16 which automatically responds to the indications provided by the sensing device 20 (FIG. 1) to select and apply the tones according to the desired sequence as explained above. The coder has manual control switches 17 and 18 which permit manual as well as automatic operation of the equipment 10. The recorder 22 may be used in conjunction with switches 17 and 18 for centralized testing of all banks. Thus, any malfunctioning equipment at the switching stations can be detected and identified quite readily, and this facilitates scheduling of maintenance work at convenient times.

Figure 3:
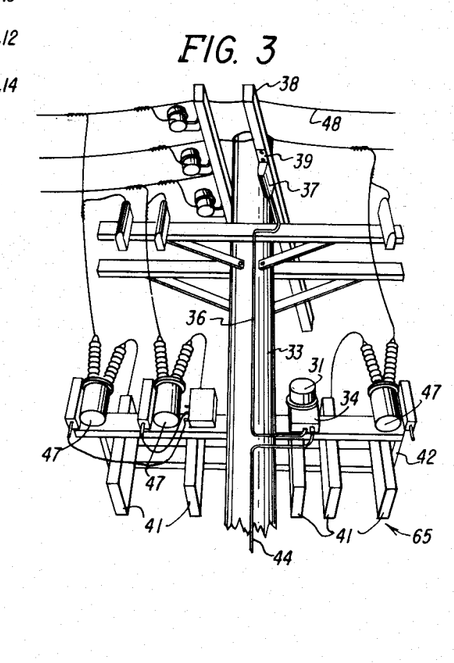
FIG. 3 is a view of a transmission line pole provided with a control unit and associated apparatus for switching a bank of capacitors.

Switching control apparatus 66 is provided at each switching station 69 to operate the switches 47 and thereby connect or disconnect the capacitors 65. The control unit 31 may be mounted along with the switches 47 and capacitor bank 65 on top of a transmission line pole 33 as shown in FIG. 3. The capacitors 41 in the bank 65 are mounted on a rack 42 which also mounts a socket device 34 through which all connections to the control unit 31 are made. In FIG. 1 the connections are illustrated for the switching control apparatus 66 at only one of the switching stations (shown in dotted enclosure 69) since the connections for the other switching stations may be the same. The socket device is connected by cable 36 to a potted loop antenna 37 mounted under the cross arm 38 by a bracket 39. Alternating current power is supplied to the socket device 34 through lead 44. The switching output of the control unit 31 is supplied through lead 30 and the socket device to the various capacitor switches 47. The control unit 31 is provided with plug-in terminals which correspond to terminals in the socket device for making the connections to the antenna 37, the switches 47 and the power supply lead 44. The complete capacitor assemblies may be supplied with the socket device 34 already mounted and wired, so that the line crew which installs the banks has only to plug in the control unit, make connection to the secondary bus, and mount and connect the antenna 37. The control unit 31 is housed in a standard plug-in meter case which is interchangeable with plug-in time clock regulators. This permits easy conversion of existing regulating equipment to remote control and permits interchanging various types of control equipment if desired.

Figure 4:
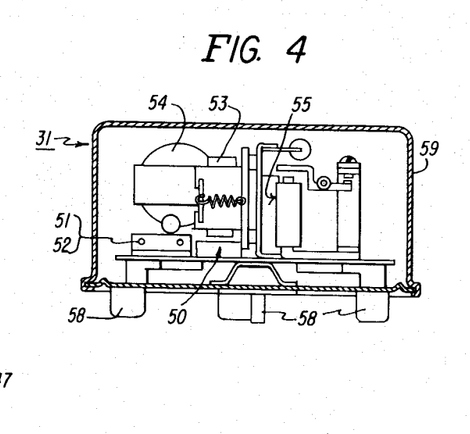
FIG. 4 is a view showing the interior of the control unit of FIG. 3.

The interior of the control unit 31 is shown in FIG. 4. The unit contains a transistorized carrier receiver 50, and two resonant-reed relays 51 and 52 which are connected in a switching control circuit along with a pair of control relays 53 and 54. The relays 53 and 54 control a double acting latching relay 55 which in turn opens or closes the capacitor switches and also locks out the "off" reed relay when the capacitor switch has been opened and similarly locks out the "on" reed relay when the capacitor switch has been closed. The plug-in terminals 58 of the control unit are shown in FIG. 4. There are five terminals: one for connection to the antenna 37, two for connection to the source of power, and two for applying the switching output to the capacitor switches. The control unit 31 has a glass cover 59 which is roughened and painted with a reflective coating as previously mentioned.

Figure 5:
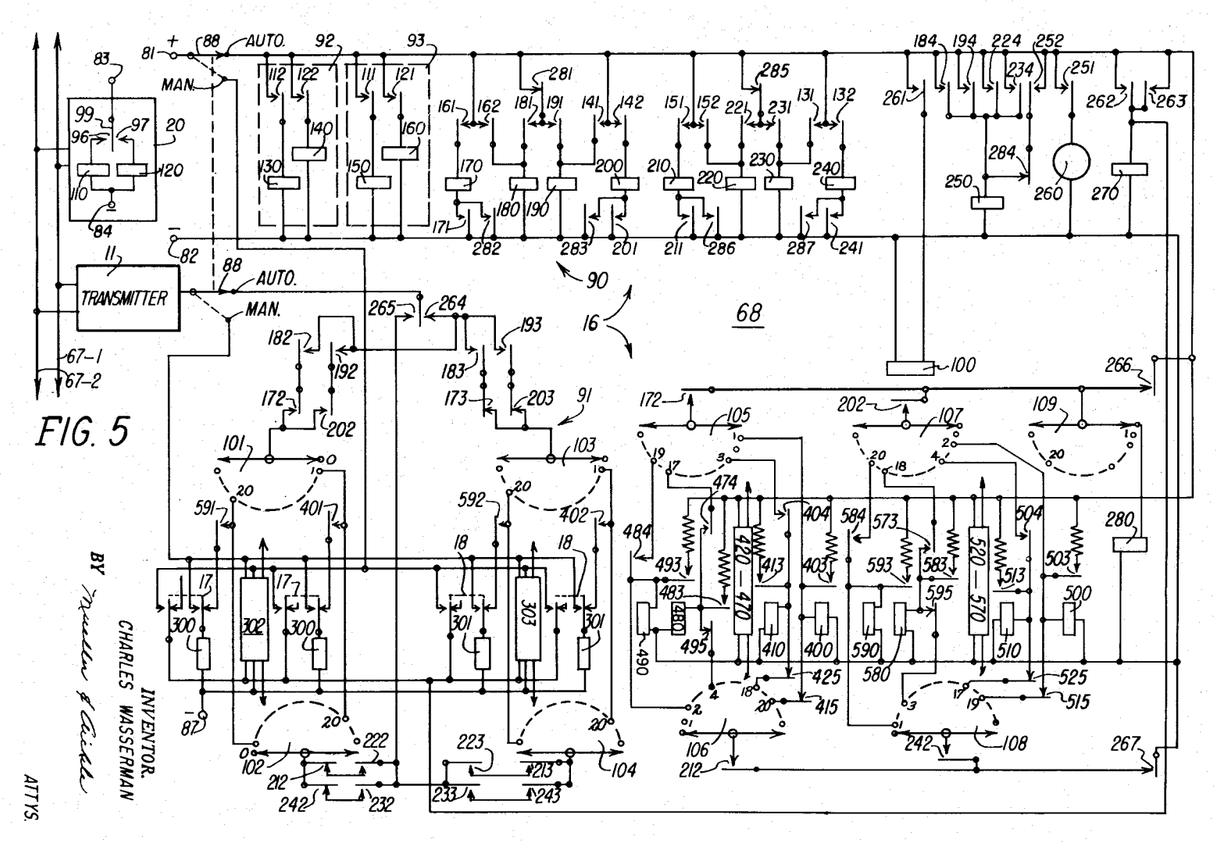
FIG. 5 is a circuit diagram for the equipment provided at the central control station.
Figures 6, 7:
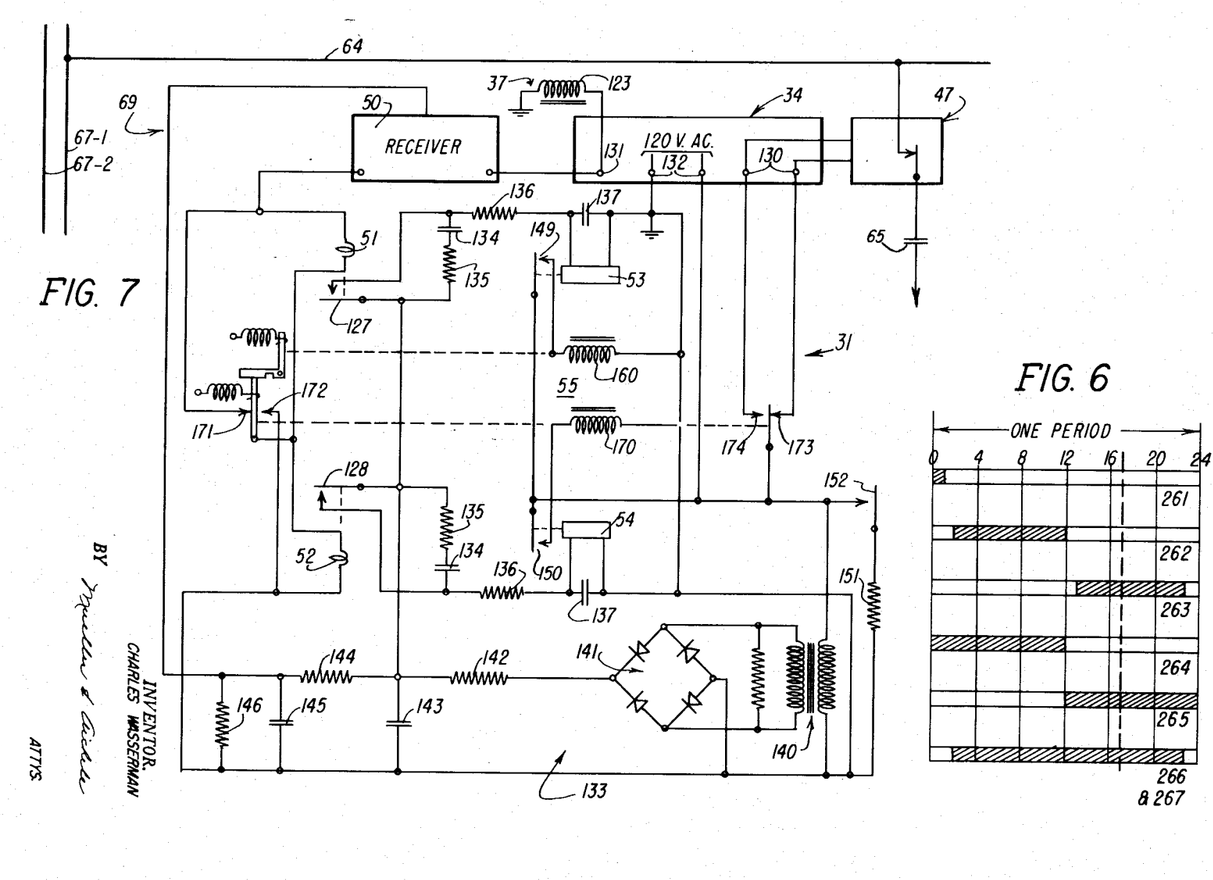
FIG. 6 is a graph showing the program of the timer included in the equipment at the central station.
FIG. 7 is a circuit diagram for the apparatus provided at the switching station.

The circuits for the equipment 10 at the central control station 68 and for the switching control apparatus 66 at the switching station 69 are shown in FIGS. 5 and 7 respectively. The circuits illustrate one specific embodiment of the invention which will be described completely. Two four kilovolt busses 67-1 and 67-2 are at the left of FIGS. 5 and 7, and one of the feeder lines 64 has a capacitor bank 65 connected thereto through a switching unit 47 (FIG. 7). The sensing device 20 and the transmitting assembly 11 at the central station 68 (FIG. 5) are connected to two busses 67-1 and 67-2 so that both busses may be controlled simultaneously with the same equipment. Although this arrangement is advantageous for certain applications, it will be apparent that the circuit principles are equally applicable to single-bus control.

The coder 16 at the central station includes two main parts, the sequence control circuit 90, and the frequency control circuit 91. The sequence control circuit is energized from plus terminal 81 to negative or reference potential 82. The frequency controlling circuit 91 of the coder 16 is connected to the transmitter 11, with terminal 87 providing a negative or reference potential. Direct current potential is supplied to the sensing device 20 between plus terminal 83 and the negative or reference potential 84.

The contacts for the various relays are shown distributed throughout the circuit in order to facilitate the description of the coordination between the relays and the particular circuits they control. To permit identification of the contacts with a particular relay, a key system will be followed whereby the relays are designated by a base numeral such as 100 and the associated contacts are designated by succeeding numerals. A new base numeral such as 110 designates the next relay considered.

The transmitting assembly 11 provided at the central station and the receiver 50 provided in the control unit 31 at the switching station may be selected to suit the requirements of the system, and therefore the circuits of these units are not described in detail. Frequency modulation transmitters and receivers which may be provided with resonant-reeds for frequency selection are commercially available and have been found to be particularly suitable for this application.

*Initiation and sequencing of tones at the central station*

The frequency of the "on" tones is controlled by a group of resonant-reeds 300 which are connected one at a time to the transmitter 11 through contact level 101 or 102 of a stepping switch associated with the actuator 100. Similarly, the frequency of the "off" tones is controlled by a group of resonant-reeds 301 which are connected to the transmitter through contact level 103 or 104. There are twenty resonant-reeds in each of the groups 300 and 301. Ten of the reeds in each group provide tones which represent capacitors on bus section 67-1, and the other ten reeds in each group provide tones representing capacitors on the bus section 67-2. The ten reeds for bus section 67-1 are the ones connected to odd-numbered contacts of levels 101 and 103, and the ten reeds for bus section 67-2 are the ones connected to the even-numbered contacts of levels 102 and 104. Only two of the reeds in each group are shown, and the enclosures 302 and 303 represent the remainder of the reeds along with the manual switches, relay contacts and conductors associated therewith.

When switch 88 is moved to the manual position, any desired tone may be selected by manually controlling switches 17 for "on" tones and 18 for "off" tones. When any one of the switches 17 and 18 is operated, the associated reed is connected to the transmitter 11 through the manual contacts of switch 88, and positive potential is applied from terminal 81 to energize relay 270 which operates contacts in the transmitter 11 to start modulation of the oscillator thereof.

With switch 88 in the automatic position, the armature 99 of the sensing device 20 will close contact 96 connected to relay 110, or contact 97 connected to relay 120, depending on whether more or less capacitors are needed on either of the busses 67-1 or 67-2. When the reactive load on either bus is too high, relay 110 is energized, and when the reactive load is too low, relay 120 is energized. The control circuit 90 includes a pair 92 of primary relays 130 and 140 for control of bus 67-2 and another pair 93 of primary relays 150 and 160 for control of bus 67-1. The primary relays are responsive to energization of the sensing relays 110 and 120 to initiate operation of the coder 116.

Secondary relays 170, 180, 210 and 220 are controlled by the primary relays 93, and other secondary relays 190, 200, 230 and 240 are controlled by the primary relays 92. The secondary relays have contacts in the frequency controlling circuit 91 which automatically select between the two groups of resonant-reeds 300 and 301 according to the needs of the distribution system. Relay 250 controls the timer unit 260, and relay 280 prevents the secondary relays from being reenergized after the load has been corrected until the scan of the stepping switch is completed.

The timer unit 260 includes a motor which drives a shaft to rotate a number of cams which control the timing contacts 261 to 267 inclusive. The cams may rotate once each 24 seconds, and the wipers of the contact levels 101 to 109 inclusive step once during each of these periods as will be explained. Since there are twenty-six positions on the contact levels, a complete scan or sequence requires ten minutes and twenty-four seconds. These times may be varied to suit the requirements of a particular application. The program for the contacts 261–267 of the timer unit 260 is illustrated by the graph of FIG. 6 which shows the portions of each period during which the timing contacts are open (unshaded) and closed (shaded).

The operation will be described with the circuits starting in the condition where the wipers of all levels of the stepping switch are in the "home" or zero position, and with the timer 260 set near the end of a period (as indicated by the dotted vertical line in FIG. 6) so that timing contacts 263, 265, 266 and 267 are closed. The relay 280 is energized through contacts 266, so that contacts 281, 284 and 285 are open and contacts 282, 283, 286 and 287 are closed. At the start, there may be no capacitors on bus 67–1 so the sensing device 20 operates to close contacts 97 and energize relay 120 to switch capacitors on the line. When relay 120 pulls in, contact 121 closes to energize primary relay 160. Secondary relays 170 and 180 are then energized through contacts 161 and 162. Relays 170 and 180 respectively have contacts 172 and 182 in the frequency controlling circuit 91 which select the group 300 of resonant-reeds through contact level 101 to apply "on" tones to the transmitter 11.

The sequence in which tones are applied to the transmitter 11 is controlled by the contact levels 101–104, timer 260 and the secondary relays. With relays 170 and 180 energized as explained, relay 250 is energized through contact 184 and contact 251 closes to complete the energizing circuit for the motor of the timer 260. The stepping switch actuator 100 is energized through contact 261. When the timer 260 approaches the end of the period, timing contacts 263, 266 and 267 open. The opening of contact 266 drops out relay 280 so that contacts 281, 284, and 285 now close and contacts 282, 283, 286 and 287 open. Relay 170 is held in by its own contact 171 which parallels contact 282, and relay 180 is held in by its own contact 181 until the end of a complete sequence when relay 280 is energized again as will be explained. Since relay 280 remains de-energized until the end of the sequence, the secondary relays 170, 200, 210 and 240 which drop out after the load is corrected cannot be re-energized until the end of the sequence, even if the sensing device should operate again before then, because contacts 282, 283, 286 and 287 are open.

The timer 260 reaches the end of the period where it was set and then starts the first period of the sequence. Contact 261 closes and then opens after about one second to pulse actuator 100 and step the various levels of the stepping switch to the first position. After two seconds of the period have passed, contact 262 closes to energize the starting relay 270 which conditions the oscillator of the transmitter 11 for modulation as previously explained. Contacts 266 and 267 of the timer also close after two seconds to apply positive potential to the wipers of levels 105 to 109. The memory relay 400 which is connected to the first contact of stepping switch level 105 is then energized and holds in through its own contact 403, and this closes the memory contact 401 connected to the first reed in group 300. The frequency controlling circuit 91 is now completed through contacts 264, 172, 182, the first contacts of level 101, and contact 401 connected thereto so that an "on" tone is supplied to bus 67–1. This tone is sent until 12 seconds of the period has passed, and at this point contact 264 opens to break the frequency controlling circuit. No tone is sent out for the remainder of the period since the frequency controlling circuit is not completed to any other reed at this time. At the beginning of the next period, contact 261 closes and opens again to energize and de-energize actuator 100 and step levels 101–109 to the second position. There is no memory relay connected to the second contact of level 105, and the memory relay 500 connected to the second contact of level 107 is not energized. Therefore, no tone is sent out while the stepping switch remains in the second position. This alternating arrangement between odd and even contacts of levels 101–104 is carried out for positions 1 through 20 so that tones may be sent out at the odd positions for controlling bus 67–1 and other tones may be sent out at the even positions for controlling bus 67–2.

Contact 261 closes and opens once for each 24 second period provided by the timer 260 so that the actuator 100 is operated once for each period. The other timing contacts follow the program shown in FIG. 6. Thus, contact level 101 steps along and selects "on" tones from the odd numbered reeds in group 300 so long as contacts 172 and 182 remain closed. When the load characteristic has been corrected, relays 120, 160 and 170 drop out. This breaks the frequency controlling circuit to contact level 101, but since relay 180 remains energized a circuit is completed through contacts 183 and normally closed contacts 173 to stepping switch contact level 103 which is connected to the "off" reeds 301 so that "off" tones will be sent out for the remainder of the sequence. When levels 101 to 109 reach the zero position, relay 280 is energized when contact 266 close after two seconds of the period. Relays 180 and 250 are respectively dropped out when normally closed contacts 281 and 284 open, and the motor of timer 260 is dropped out when contact 251 opens. Thus, the sequence ends before the end of the last period thereof so that relay 280 remains energized to condition the coder for the next operation.

It may be noted that complementary primary and secondary relays are provided for operation by the sensing relay 110 to take capacitors off bus 67–1. When relay 110 is energized, relays 150, 210 and 220 are energized to complete the frequency controlling circuit 91 to contact level 104 for selecting "off" tones from the reed group 301. When the load characteristic has been corrected, relays 110, 150 and 210 drop out, but relay 220 remains energized so that "on" tones from reed group 300 are applied to the transmitter through contacts 212 and 222 for the remainder of the sequence. Contact levels 102 and 104 are connected to the reed groups 300 and 301 in reverse order so that the capacitors will be switched off in a "last-on, first-off" sequence. As shown in FIG. 6, contact 265 closes after 12 seconds of each period of the timer. Therefore, no tones are sent out during the first 12 seconds and the "off" tones are sent out during the second 12 seconds in each period while contact 265 is closed. The even-numbered contacts of level 106 are connected to the memory relays 400–489 in reverse order, and the memory relays representing capacitors which are being switched off the line are de-energized as level 106 steps along and shorts out the coils thereof. The operation of the timing contacts is apparent from the previous description, so this will not be explained again.

Other primary and secondary relays are provided for control of the other bus 67–2. Primary relays 130 and 140 are operated respectively by sensing relays 110 and 120. Secondary relays 190 and 200 are operated by primary relay 140 when more capacitors are needed on the line, and secondary relays 230 and 240 are operated by primary relay 130 when fewer capacitors are needed on the line. The contacts 192, 202, 193, 203, 232, 242, 233 and 243 of the secondary relays which select tones for bus sections 67–2 are in parallel with the contacts 172, 182, 173, 183, 212, 222, 213 and 223 which select tones for bus section 67–1. The operating sequence for the contacts in parallel is the same as previously described and it is believed to be unnecessary to repeat this explanation. Tones will be sent out when the wipers of levels 100–109 are in the even-numbered positions, with "on" tones from reeds 300 being sent during the first part of the timer periods and "off" tones from reeds 301 being sent during the second half of the periods in accordance with the program of FIG. 6. The memory relays 500–509 are energized through level 107 when capacitors are being added and are de-energized by level 108 when capacitors are being taken off in the manner described in connection with memory relays 400–409.

*Response to tones at the switching stations*

The circuit for the equipment at one of the switching stations 69 including a control unit 31 is shown in FIG. 7. Alternating current is applied from terminals 132 to the latching relay 55 and to the switching output terminals 130. The power supply circuit 133 of the control unit provides direct current potential for the switching control circuit including reeds 127 and 128, capacitors 134, resistors 135, resistors 136, capacitors 137, and relays 53 and 54. The diode bridge 141 rectifies the alternating current supplied from terminals 132 through transformer 140, and a network including resistor 142 and capacitor 143 filters the rectified current and provides the direct current potential which is applied to the switching control circuit. Another filter network including resistors 146 and 144 and capacitor 145 applies a lower potential to the receiver 50. A wire-bound resistor 151 provides heat in the interior of the control unit 31 as previously mentioned, and the temperature is controlled by a thermostat 152.

As carrier signals come in over the feeder 64, they are picked up by the loop antenna 37 including coil 123 which is wound on a ferrite core. The control signals are applied through terminal 131 of the socket device 34 to the receiver 50. The audio frequency component of the control signal is detected by the receiver and the output audio signal is applied to the two resonant-reed relays 51 and 52 respectively having resonant-reeds 127 and 128. When one of the reeds 127 and 128 is vibrated it makes intermittent contact which tends to make the current in the switching control circuit a series of pulses. However, capacitors 134 and resistors 135 provide sufficient time constant so that the current delivered to the control relays 53 and 54 is made continuous. Resistors 136 limit the current through the reeds 127 and 128, and also act with capacitors 137 to integrate the energizing current and extend the time constant, thus providing a time delay which insures positive operation.

When either of the control relays 53 and 54 is energized to close contacts 149 or 150, an alternating current circuit is completed through the mechanically latching relay 55. Relay 55 includes a release coil 160 and a latching coil 170 having contacts 171 and 172 connected respectively to the reed relays 51 and 52 and contacts 173 and 174 connected to the switching output terminals 130. When the capacitor 65 is on the feeder line 64 as illustrated, the coil of the resonant-reed relay 52 which is responsive to "off" tones is connected to the output of receiver 50 and contacts 171 short out reed relay 51 which is responsive to "on" tones. Thus, the switching control circuit can be energized only by the next tone to which the "off" reed relay 52 is responsive. When on "off" tone of appropriate frequency is received, contacts 150 are closed by control relay 54 to energize and latch the armature of latching coil 170, which in turn opens contacts 171 and 173 and simultaneously closes contacts 172 and 174. Thus, the "off" reed relay 52 is shorted out, and the switch 47 is opened to take capacitor 65 off the line. Then when an "on" tone of appropriate frequency is received, reed relay 51 operates and energizes control relay 53. Contacts 149 close and energize the release coil 160 which unlatches the armature of coil 170. Contacts 171 and 173 then close and contacts 172 and 174 open so the circuit is now in the original condition with the capacitor on the line.

It is apparent from the foregoing description that the capacitor switching system of the invention permits centralized control over a large number of line capacitors. The system may provide both thermal and voltage control, and cuts power losses considerably. Many safeguards are incorporated to provide reliable operation, and equipment exposed to the weather is adequately protected. The control units are compact and efficient and require little maintenance. Any need for maintenance can be readily detected at the central control station, and maintenance and installation costs are minimized by the use of plug-in units at the switching stations. The equipment is much less expensive than prior equipment to compensate for changes in variation load such as tap changing transformers. In view of the many benefits provided by the extensive use of properly controlled line capacitors, the system may be applied widely resulting in substantial operating economies.

I claim:

1. An automatic remote control system for use in a power distribution system which includes a power distribution station for supplying power to transmission lines, and which system includes a plurality of power factor correcting capacitors for connection to the transmission lines and sensing apparatus at the power distribution station responsive to predetermined load characteristics of the transmission lines to indicate when more or less capacitors are needed on the lines; said remote control system controlling the connection of such capacitors to the lines and including in combination, a plurality of switching control stations each associated with a capacitor, and a central control station associated with the power distribution station, said central control station including modulated carrier transmitting apparatus for supplying to the transmission lines a carrier wave modulated by control signals, and coding apparatus responsive to the sensing apparatus for selectively applying control signals of different frequencies to said transmitting apparatus in a controlled sequence, whereby the carrier wave is modulated by signals determined by the load characteristics of the transmission lines, said switching control stations each having a control unit including carrier receiver means for deriving the control signals from the received carrier wave, and control means connected to said receiver means and including frequency selective means responsive to received control signals of predetermined frequencies for controlling the connection of said capacitors to the transmission lines.

2. An automatic remote control system for use in a power distribution system which includes a power distribution station for supplying power to transmission lines, and which system includes a plurality of power factor correcting capacitors for connection to the transmission lines, and sensing apparatus at the power distribution station responsive to predetermined load characteristics of the transmission lines to indicate when more or less capacitors are needed on the lines, said remote control system controlling the connection of such capacitors to the lines and including in combination, a plurality of switching control stations each associated with a capacitor, and a central control station associated with the power distribution station, said central control station including modulated carrier transmitting apparatus for supplying to the transmission lines a carrier wave modulated by control signals, and coding apparatus responsive to the sensing apparatus for selectively applying control signals of different frequencies to said transmitting apparatus in a controlled sequence, whereby the carrier wave is modulated by signals determined by the load characteristics of the transmission lines, said coding apparatus operating to repeat the selection and transmission of said modulating signals, said switching control stations each having a control unit including carrier receiver means for deriving the control signals from the received carrier wave, and control means connected to said receiver means and including frequency selective means responsive to received control signals of predetermined frequencies for controlling the connection of said capacitors to the transmission lines.

3. An automatic remote control system for use in a power distribution system which includes a power distribution station for supplying power to transmission lines, and which system includes a plurality of power factor correcting capacitors for connection to the transmission lines, and sensing apparatus at the power distribution station responsive to predetermined load characteristics of the transmission lines to indicate when more or less capacitors are needed on the lines, said remote control system controlling the connection of such capacitors to the lines and including in combination, a plurality of switching control stations each associated with a capacitor, and a central control station associated with the power distribution station, said central control station including modulated carrier transmitting apparatus for supplying to the transmission lines a carrier wave modulated by control signals, and coding apparatus responsive to the sensing apparatus for selectively applying on and off control signals of different frequencies to said transmitting apparatus in a controlled sequence, whereby the carrier wave is modulated by signals determined by the load characteristic of the transmission lines, said coding apparatus including memory circuit means for indicating the number of on and off control signals in said sequence to permit determination of the number of said capacitors connected to the line, said switching control stations each having a control unit including carrier receiver means for deriving the control signals from the received carrier wave, and control means connected to said receiver means and including frequency selective means responsive to received control signals of predetermined frequencies for controlling the connection of said capacitors to the transmission lines.

4. An automatic remote control system for use in a power distribution system which includes a power distribution station for supplying power to transmission lines, and which system includes a plurality of power factor correcting capacitors for connection to the transmission lines and sensing apparatus at the power distribution station responsive to predetermined load characteristics of the transmission lines to indicate when more or less capacitors are needed on the lines; said remote control system controlling the connection of such capacitors to the lines and including in combination, a plurality of switching control stations each associated with a capacitor, and a central control station associated with the power distribution station, said central control station including modulated carrier transmitting apparatus for supplying to the transmission lines a carrier wave modulated by control signals, a power factor correcting capacitor for coupling said transmitting apparatus to the transmission line, and coding apparatus responsive to the sensing apparatus for selectively applying control signals of different frequencies to said transmitting apparatus in a controlled sequence, whereby the carrier wave is modulated by signals determined by the load characteristics of the transmission lines, said switching control stations each having a control unit including transistorized carrier receiver means for deriving the control signals from the received carrier wave, and control means connected to said receiver means and including frequency selective means responsive to received control signals of predetermined frequencies for controlling the connection of said capacitors to the transmission lines.

5. An automatic remote control system for use in a power distribution system which includes a power distribution station for supplying power to transmission lines, and which system includes a plurality of power factor correcting capacitors for connection to the transmission lines and sensing apparatus at the power distribution station responsive to predetermined load characteristics of the transmission lines to indicate when more or less capacitors are needed on the lines; said remote control system controlling the connection of such capacitors to the lines and including in combination, a plurality of switching control stations each associated with a capacitor, and a central control station associated with the power distribution station, said central control station including modulated carrier transmitting apparatus for supplying to the transmission lines a carrier wave modulated by control signals, and coding apparatus responsive to the sensing apparatus for selectively applying control signals of different frequencies to said transmitting apparatus in a controlled sequence, whereby the carrier wave is modulated by signals determined by the load characteristics of the transmission lines, said switching control stations each having a control unit, inductive antenna means for coupling the modulated carrier wave from the transmission line to said control unit, said control unit including transistorized carrier receiver means for deriving the control signals from the received carrier wave, and control means connected to said receiver means and including frequency selective means responsive to received control signals for predetermined frequencies for controlling the connection of said capacitors to the transmission lines.

6. An automatic remote control system for selectively connecting a plurality of power factor correcting capacitors to a power transmission line supplied with power from a power distribution station, said system including in combination, a plurality of switching control stations each associated with a capacitor, and a central control station associated with the power distribution station, said central control station including modulated carrier transmitting apparatus for supplying to the transmission line a carrier wave modulated by control signals representing said switching control stations, sensing apparatus responsive to a predetermined load characteristic of the transmission line to provide indications when more or less capacitors are needed on the line, and coding apparatus including first and second frequency controlling means for respectively providing a plurality of modulating signals of different frequencies, scanning means for applying the modulating signals to said transmitting apparatus in a controlled sequence, and selection means for selecting modulating signals from one of said first and second frequency controlling means in response to a corresponding indication of said sensing apparatus and for selecting modulating signals from the other one of the same when the load has been corrected, whereby the carrier wave is modulated by on and off control signals in a sequence determined by the load characteristic, and said switching control stations each having a control unit including carrier receiver means for deriving the control signals from the carrier wave received from said central control station, and control means connected to said receiver means and including frequency selective relay means for controlling the connection of said capacitors to said line in response to an on and an off control signal.

7. An automatic remote control system for selectively connecting a plurality of power factor correcting capacitors to a power transmission line supplied with power from a power distribution station, said system including in combination, a plurality of switching control stations each associated with a capacitor, and a central control station associated with the power distribution station, said central control station including modulated carrier transmitting apparatus for supplying to the transmission line a carrier wave modulated by control signals representing said switching control stations, sensing apparatus responsive to a predetermined load characteristic of the transmission line to provide indications when more or less capacitors are needed on the line, and coding apparatus including first and second frequency controlling means each having a plurality of resonant-reeds for providing a plurality of modulating signals of different frequencies, scanning means for applying the modulating signals to said transmitting apparatus in a controlled sequence, relay means for automatically selecting one of said first and second frequency controlling means in response to a corresponding indication of said sensing apparatus and for selecting the other one of the same when the load has been corrected, and switch means for manual selection of individual ones of the modulating signals provided by said resonant reeds, and said switching control stations each including a control unit, and loop antenna means coupling said control unit to the transmission line, said control unit including transistorized carrier receiver means for deriving control signals from the modulated carrier wave received from said central control station, first and second resonant reed relays connected to said receiver means and having vibratory contactors responsive respectively to an on and an off control signal, an alternating current output circuit including a latching relay having first contacts for controlling the connection of the capacitor to the transmission line and having second contacts controlling energization of said resonant reed relays and locking out the one thereof most recently operated, and a direct current switching control circuit including said contactors of said resonant reed relays, direct current relay means having contacts in said output circuit controlling energization of said latching relay, means having a time constant to provide continuous energizing current for said direct current relay means, and means for extending said time constant to provide a time delay assuring positive operation of said resonant-reed relays before energization of said direct current relay means.

8. An automatic remote control system for selectively connecting a plurality of power factor correcting capacitors to first and second power transmission lines supplied with power from a power distribution station, said system including in combination, a plurality of switching control stations each associated with a capacitor, and a central control station associated with the power distribution station, said central control station including modulated carrier transmitting apparatus for supplying to the transmission lines a carrier wave modulated by control signals representing said switching control stations, sensing apparatus responsive to a predetermined load characteristic of both transmission lines to provide indications when more or less capacitors are needed on either line, and coding apparatus including first and second frequency controlling means for respectively providing a plurality of modulating signals of different frequencies, scanning means for applying the modulating signals to said transmitting apparatus in a controlled sequence, and selection means including first and second relay means for respectively selecting one of said first and second frequency controlling means when said sensing apparatus responds to a change in the load characteristic of said first and second lines and for selecting the other one of the same when the load characteristic has been corrected, whereby the carrier wave is modulated by on and off control signals in a sequence determined by the load characteristic, and said switching control stations each having a control unit including transistorized carrier receiver means for deriving the control signals from the carrier wave received from said central control station, and control means connected to said receiver means and including frequency selective relay means for controlling the connections of said capacitors to said line in response to an on and an off control signal.

9. An automatic remote control system for selectively connecting a plurality of power factor correcting capacitors to a power transmission line which is supplied with power from a distribution station, said system including in combination, a plurality of switching control stations each associated with a switched capacitor, and a central control station associated with the power distribution station, said central control station including modulated carrier transmitting apparatus for supplying to the transmission line a carrier signal modulated by control frequencies representing said switching control stations, sensing apparatus responsive to a predetermined load characteristic of the transmission line to indicate whether more or less capacitors are needed on the transmission line, and coding apparatus including first and second groups of resonant-reeds for respectively providing sets of on and off modulating signals each of a different frequency, and coding control circuit means including stepping switch means for scanning through either of said groups of resonant-reeds in forward and reverse order to apply said modulating signals to said transmitting apparatus in a controlled sequence, said coding control circuit means further including relay means for selecting one of said groups of resonant-reeds in response to the indication of said sensing apparatus to provide modulation with signals of one of said sets thereof during a portion of the scan of said stepping switch means until said load characteristic is corrected, said relay means being operable to select the other of said groups of resonant-reeds when the load characteristic is corrected to provide modulation with signals of the other of said sets thereof until said stepping switch means has scanned through the remainder of the sequence, and said switching control stations each including a control unit, and antenna means coupling said control unit to the transmission line for applying the received modulated carrier signal thereto, said control unit comprising carrier receiver means for deriving control frequencies from the modulation of the received carrier signal, switching circuit means for providing a switching output to control the connection of the capacitor, first and second resonant-reed relays connected to said receiver means and responsive respectively to predetermined on and off control frequencies, said first and second resonant-reed relays having contacts in said switching circuit means for energizing the same, and said switching circuit means including output relay means having first contacts providing a switching control output and second contacts operable to lock out the one of said resonant-reed relays most recently operated.

10. An automatic remote control system for switching a plurality of power factor correcting capacitors on and off a power transmission line, said system including in combination, a central control station including transmitting apparatus for supplying to the transmission line a carrier signal modulated by control frequencies representing the various capacitors, sensing apparatus having on and off initiating circuits and responsive to a predetermined load characteristic to complete one of the same for initiating modulation of the carrier signal, and coding apparatus comprising a frequency controlling circuit connected to said transmitting apparatus and including first and second groups of resonant-reeds for respectively providing on and off sets of modulating tones each of a different frequency, and a coding control circuit including stepping switch means having contact levels in said frequency controlling circuit for making connections to said groups of resonant-reeds in a controlled sequence and for scanning through either group thereof in forward and reverse order, and relay means responsive to operation of said sensing apparatus and having first contacts in said frequency controlling circuit for completing the same selectively through the group of resonant-reeds which corresponds to the particular initiating circuit energized by said sensing apparatus until the load characteristic is corrected, said relay means having second contacts in said frequency controlling circuit for selectively completing the same through the other group of resonant-reeds when the load characteristic is corrected until said stepping switch means has scanned through the remainder of the sequence, and a plurality of remotely located switching stations each having switching control apparatus responsive selectively to one of said on tones and one of said off tones to switch a capacitor associated therewith, whereby the carrier signal received by said control unit is modulated by tones in a sequence determined by the load characteristic, with each sequence including one tone for each switching station to substantially ensure that the condition of the capacitors is in compliance with a desired schedule.

11. An automatic remote control system for switching a plurality of power factor correcting capacitors on and off a power transmission line, said system including in combination a central control station having sensing, coding, and modulated carrier transmitting apparatus, said sensing apparatus having on and off initiating circuits and being responsive to a predetermined load characteristic to complete one of the same when there is a need for more or less capacitors on the line, said coding apparatus comprising a frequency controlling circuit connected to the transmitting apparatus and including first and second groups of resonant-reeds for respectively providing on and off modulating tones each of a different frequency, and coding control circuit means including stepping switch means having first contact levels in said frequency controlling circuit for making connections to said resonant-reeds in a controlled sequence and for scanning through either group thereof in forward and reverse order, said stepping switch means having second contact levels for memory operation, a plurality of memory relays connected individually to the contacts of said second levels of said stepping switch means, said memory relays being operated sequentially as said stepping switch means scans for indicating the number of tones of either type applied to said transmitting apparatus, and control relay means responsive to operation of said sensing apparatus and having first contacts in said frequency controlling circuit for completing the same selectively through the group of resonant-reeds which corresponds to the particular initiating circuit energized by said sensing apparatus until the load characteristic is corrected, said control relay means having second contacts in said frequency controlling circuit to complete the same selectively through the other group of resonant-reeds when the load characteristic is corrected until said first stepping switch means has scanned through the remainder of the sequence, and a plurality of remotely located switching stations each having switching control apparatus responsive to one of said on tones and one of said off tones to switch a capacitor associated therewith.

12. An automatic remote control system for selectively connecting a plurality of power factor correcting capacitors to first and second power transmission lines supplied with power from a power distribution station, said system including in combination, a central control station having sensing, coding, and modulated carrier transmitting apparatus for supplying a modulated carrier wave to said first and second transmission lines, said sensing apparatus being responsive to a predetermined load characteristic of the transmission lines to provide indications when more or less capacitors are needed on either line, said coding apparatus comprising a frequency controlling circuit including first and second groups of resonant-reeds for respectively providing on and off modulating tones each of a different frequency, and coding control circuit means including stepping switch means having first contact levels in said frequency controlling circuit for making connections to said resonant-reeds in a controlled sequence and for scanning through either group thereof in forward and reverse order, said stepping switch means having second contact levels for memory operation, a plurality of memory relays connected individually to the contacts of said second levels of said stepping switch means, said memory relays being operated sequentially as said stepping switch means scans, said memory relays having contacts in said frequency controlling circuit for selecting the resonant reeds in said groups thereof which provide tones representing the capacitors on the transmission to which said sensing apparatus responds at a given time, and control relay means responsive to operation of said sensing apparatus and having contacts connected to said first and second levels of said stepping switch means for selecting modulating signals from either one of said first and second groups of resonant reeds in response to a corresponding indication of said sensing apparatus and for selecting the memory relays corresponding to the transmission line to which said sensing apparatus responds at a given time, whereby the carrier wave is modulated by tones in a sequence determined by the load characteristic of either line, and a plurality of remotely located switching stations each having switching control apparatus responsive to one of said on tones and one of said off tones for switching a capacitor associated therewith.

13. Switching control apparatus for responding to a carrier signal modulated by control signals to control the connection of a power factor correcting capacitor to a power transmission line, said switching control apparatus including in combination, transistorized carrier receiver means for deriving control frequencies from the modulation of the carrier signal received over the transmission line, loop antenna means for coupling the modulated carrier signal to said receiver means, an alternating current output circuit including a latching relay having first contacts for controlling the connection of the capacitor to the transmission line, a direct current switching control circuit including direct current relay means having contacts in said output circuit for controlling the energization of said latching relay, first and second resonant-reed relays connected to said receiver means and selectively energized by different predetermined control frequencies, said resonant-reed relays having reed contacts in said switching control circuit for controlling the energization of said direct current relay means, said latching relay having second contacts for controlling energization of said resonant-reed relays and for locking out the one thereof most recently operated to prevent undesired switching.

14. Switching control apparatus as defined in claim 13 with said reed contacts of said resonant-reed relays in said switching control circuit being closed intermittently upon energization thereof, thereby tending to produce current pulses in said switching control circuit, means in said switching control circuit having a time constant to provide a continuous current therein, and means for extending said time constant for providing a time delay to ensure positive operation of said resonant-reed relays before energization of said direct current relay means.

15. An automatic remote control system for selectively operating a plurality of devices associated with a transmission line and having first and second conditions, said system including in combination, a plurality of remote control stations each associated with one of the devices, and a central control station including modulated carrier transmitting apparatus for supplying to the transmission line a carrier wave modulated by control signals representing said remote control stations, and coding apparatus including first and second frequency controlling means for respectively providing a plurality of modulating signals of different frequencies, scanning means for sequentially applying the modulating signals to said transmitting apparatus, and selection means for selecting from said first frequency controlling means during part of the scan of said scanning means modulating signals representing the first condition of the devices and for selecting from said second frequency controlling means during another portion of the scan modulating signals representing the second condition of the devices whereby the carrier wave is modulated by the signals from said first and second frequency controlling means in a controlled sequence, and said remote control stations each having a control unit including carrier receiver means for deriving the control signals from the carrier wave received from said central control station, and control means connected to said receiver means and including frequency selective relay means for controlling the condition of the device in response to a first and a second control signal.

16. Automatic remote control apparatus for use with a power distribution system to control the connection of capacitors to power lines of the system, said remote control apparatus including in combination, modulated carrier transmitting means for supplying to the power lines a carrier wave modulated by control signals, coding means including first and second frequency controlling means for respectively providing a plurality of modulating signals each of a different frequency, scanning means for sequentially applying selected modulating signals to said transmitting means for modulating the carrier wave, and selection means for selecting modulating signals provided by said first frequency controlling means during one part of the scan of said scanning means and for selecting modulating signals provided by said second frequency controlling means during another part of the scan of said scanning means, whereby the carrier wave is modulated by the signals from said first and second frequency controlling means in a controlled sequence, and a plurality of switching control units adapted to be associated respectively with the capacitors of the power distribution system for controlling the connection of the capacitors to the power lines in response to modulated carrier wave signals supplied thereto from said transmitting means over the power lines, each switching control unit being selectively responsive to the carrier wave as modulated by one of the signals provided by said first frequency controlling means for connecting a capacitor to a power line, and being selectively responsive to the carrier wave as modulated by one of the signals provided by said second frequency controlling means for disconnecting such capacitor from the power line.

17. Automatic remote control apparatus for use with a power distribution system to control the connection of capacitors to power lines of the system, said remote control apparatus including in combination, modulated carrier transmitting means for supplyng to the power lines a carrier wave modulated by control signals, and coding means including first and second frequency controlling means for respectively providing a plurality of modulating signals each of a different frequency, scanning means for sequentially applying selected modulating signals to said transmitting means for modulating the carrier wave, and selection means for selecting modulating signals provided by said first frequency controlling means during one part of the scan of said scanning means and for selecting modulating signals provided by said second frequency controlling means during another part of the scan of said scanning means, whereby the carrier wave is modulated by the signals from said first and second frequency controlling means in a controlled sequence.

18. Automatic remote control apparatus for use at a central station associated with a power distribution system to control the connection of capacitors to power lines of the system, said remote control apparatus including in combination, modulated carrier transmitting means for supplying to the power line a carrier wave modulated by control signals, and coding means including first and second groups of resonant-reeds for respectively providing sets of on and off modulating signals each of a different frequency, and sequence control circuit means including stepping switch means for scanning through either of said groups of resonant-reeds in forward and reverse order to apply said modulating signals to said transmitting means in a controlled sequence, said sequence control circuit means further including relay means for selecting one of said groups of resonant-reeds to provide modulation with signals of one of said sets thereof during one portion of the scan of said stepping switch means to provide modulation with signals of one of the sets thereof, and said relay means being operable to select the other of said groups of resonant-reeds during another portion of the scan of said stepping switch means to provide modulation with signals of the other set thereof.

References Cited in the file of this patent

UNITED STATES PATENTS

| | | |
|---|---|---|
| 2,404,401 | Plensler | July 23, 1946 |
| 2,484,575 | Livingston | Oct. 11, 1949 |
| 2,547,025 | Noble | Apr. 3, 1951 |
| 2,550,506 | Wasson et al. | Apr. 24, 1951 |